United States Patent
Choi et al.

(10) Patent No.: US 9,454,550 B2
(45) Date of Patent: Sep. 27, 2016

(54) DATABASE METHOD FOR B+ TREE BASED ON PRAM

(71) Applicants: INDUSTRY ACADEMIC COOPERATION FOUNDATION OF YEUNGNAM UNIVERSITY, Gyeongsangbuk-do (KR); ADVANCED INSTITUTES OF CONVERGENCE TECHNOLOGY, Gyeonggi-do (KR)

(72) Inventors: Gyu Sang Choi, Suseong-gu Daegu (KR); Byung-Won On, Guro-gu Seoul (KR); In Gyu Lee, Nam-gu Incheon (KR)

(73) Assignees: INDUSTRY ACADEMIC COOPERATION FOUNDATION OF YEUNGNAM UNIVERSITY, Gyeongsangbuk-Do (KR); ADVANCED INSTITUTES OF CONVERGENCE TECHNOLOGY, Gyeonggi-Do (KR)

( * ) Notice: Subject to any disclaimer, the term of this patent is extended or adjusted under 35 U.S.C. 154(b) by 0 days.

(21) Appl. No.: 14/235,001

(22) PCT Filed: Dec. 13, 2012

(86) PCT No.: PCT/KR2012/010834
§ 371 (c)(1),
(2) Date: Jan. 24, 2014

(87) PCT Pub. No.: WO2014/025097
PCT Pub. Date: Feb. 13, 2014

(65) Prior Publication Data
US 2015/0220574 A1    Aug. 6, 2015

(30) Foreign Application Priority Data

Aug. 10, 2012  (KR) .................. 10-2012-0087976

(51) Int. Cl.
*G06F 17/30* (2006.01)

(52) U.S. Cl.
CPC ... *G06F 17/30303* (2013.01); *G06F 17/30324* (2013.01); *G06F 17/30327* (2013.01); *G06F 17/30958* (2013.01); *G06F 17/30371* (2013.01)

(58) Field of Classification Search
CPC .................. G06F 17/30625; G06F 17/30327; G06F 17/30371
USPC ......................................... 707/609, 797–799
See application file for complete search history.

(56) References Cited

U.S. PATENT DOCUMENTS

| | | | | |
|---|---|---|---|---|
| 7,599,949 B1 * | 10/2009 | Plasek | ............... | G06F 17/30327 |
| 7,986,696 B1 * | 7/2011 | Miliavisky | ............. | H04L 45/54 370/392 |

(Continued)

FOREIGN PATENT DOCUMENTS

JP      2008-065716 A       3/2008

OTHER PUBLICATIONS

Korean Application No. KR 1020000037515 A, patent abstract for "Method for Comprising B+ Tree to Manage History", applicant Samsung Electronics Co., Ltd., publication date Jul. 5, 2000.

*Primary Examiner* — Marc Filipczyk
(74) *Attorney, Agent, or Firm* — Blakely Sokoloff Taylor & Zafman LLP

(57) ABSTRACT

A Database method for a B+ tree based on a PRAM. The database method divides each node into two areas, area 1 and area 2. A key value is inserted/retrieved/deleted for the each node. Inserting the key value requires firstly inserting a new key value to area 2 if area 2 in the node is not in a full state. Retrieving the key value requires identifying whether the node is a leaf node. If the node is a leaf node, the key value is retrieved from area 1 and area 2 sequentially. Deleting the key value requires merging area 1 and area 2 in the node, and deleting the key value in the merged node. The method enhances durability and data processing capability.

5 Claims, 5 Drawing Sheets

(56) References Cited

U.S. PATENT DOCUMENTS

| | | | | |
|---|---|---|---|---|
| 8,180,763 | B2* | 5/2012 | Freedman | G06F 17/30961 707/713 |
| 9,160,808 | B2* | 10/2015 | Zhang | G06Q 30/06 |
| 2008/0071809 | A1* | 3/2008 | Lomet | G06F 17/30327 |
| 2011/0252067 | A1 | 10/2011 | Marathe et al. | |
| 2013/0318126 | A1* | 11/2013 | Graefe | G06F 17/30327 707/797 |

* cited by examiner

DATABASE METHOD FOR B+ TREE BASED ON PRAM

TECHNICAL FIELD

The present disclosure relates to a Database method for a B+ tree based on a PRAM, and more specifically, relates to a Database method for a B+ tree based on a PRAM capable of enhancing data processing capability and durability, by applying a B+ tree construction to a PRAM data construction.

BACKGROUND ART

In recent decades, a Storage Device system based on a Hard Disk Drive (HDD) was used for a main Storage Device of Computer System; but now, some changes are observed. The reason comes from a NAND flash memory. In recent years, a Storage Device based on a NAND flash memory has been frequently used for a computer system, since the device provides advantages of high performance, low power consumption, high reliability, and small form factor, when compared to the existing HDD.

It is predicted that a market breadth of a Solid State Drive (SSD) would grow drastically in every year, since 2009. However, a market share of the NAND flash memory is small rather than HDD's. The reason comes from disadvantages of high price and equitable performance to the existing HDD, under a certain operation of an arbitrary write.

The disadvantage of high price of the NAND flash memory is being improved, by providing a high-capacity and a price decline through a Multi-level Cell (MLC). However, the SSD is still high priced compared to the HDD for a consumer. In this regard, various inventions and researches have been made in order to enlarge the market share of the storage device based on the NAND flash memory.

However, there were limits to enhance performance capabilities due to the physical aspect of the NAND flash memory (a proposal of withdrawing an erasure operation). In this regard, many companies or laboratories had conducted researches for developing a new nonvolatile RAM device to replace the NAND flash memory. As a result, a Phases change Memory (hereinafter, "PCM") and nonvolatile RAM devices such as FRAM, MRAM had been developed and still in researching for the commercialization.

These nonvolatile RAMs are a new nonvolatile memory device which overcame the disadvantages of the existing NAND flash memory. It is expected that they will be used as a storage device to replace the storage device comprised of the existing NAND flash memory only, by being used with the NAND flash memory in next generations.

Meanwhile, it is expected that the PCM is the most influential nonvolatile RAM to replace the NAND flash memory among various nonvolatile RAMs; many companies specialized in a semiconductor are now in the process of researching for the commercialization of the PCM, with enormous capital and time investments. The reasons why the PCM is considered as a storage device to replace the NAND flash memory are described as follows:

Firstly, the PCM is not configured to have a subtraction arithmetic operation unlike the NAND flash memory. The subtraction arithmetic operation most negatively influences on the performance of the NAND flash memory; the subtraction arithmetic operation is conducted per Block unit, and to have a quite long time for the arithmetic operation, about 1 ms. Due to the subtraction arithmetic operation, it can be assumed why the NAND flash memory cannot show a higher performance than the HDD in a certain arithmetic operation of an arbitrary write. However, the PCM is not configured to have the subtraction arithmetic operation; thus, high performance capability can be obtained, compared to the NAND flash memory and the HDD.

Secondly, the PCM is configured to basically read/write per bite; the NAND flash memory is configured to read/write per page. That is, the NAND flash memory requires a whole page in order to read/write data consisting of several bites; however, the PCM may read/write only necessary data. Therefore, the PCM may show a high performance in reading/writing in comparison with the NAND flash memory.

Thirdly, the number of the read/write operations of the PCM is defensively $10^6$, and the PCM has a lifespan that is ten times longer than the NAND flash memory. Although, in other researches for the PCM, the number of the write operation of the PCM was higher than $10^6$; however, the number of the write operation of the test product of the PCM is approximately $10^6$. Since the durability of the PCM is higher than that of the NAND flash memory as described above, it is expected that the PCM can replace the NAND flash memory.

However, researches for an integration degree and a commercialization of the PCM are rather insufficient than the NAND flash memory. Therefore, various researches for overcoming the disadvantages of the NAND flash memory are conducted in order for the PCM to be used with the NAND flash memory.

Lots of researches for overcoming the disadvantages of the NAND flash memory in a storage media or an operating system have been conducted, in order for the PCM to be used with the NAND flash memory; however, the researches for using the PCM and the NAND flash memory in a database system are hard to find.

The durability of the PCM has been enhanced in comparison with the NAND flash memory; however, the durability is not enough to be used as a storage device of a database. Thus, the insufficient durability issue should be solved in order for the PCM to be used as the storage device of the database.

Meanwhile, in a B+ tree which is an essential construction of material used in the database system, when analyzing a difference of the number of the write operation between each node, it can be observed that the difference of the number of the write operation between each node is quite big. Specifically, a greater number of the write operation is generated rather than other nodes, in a certain index node and a leaf node. Additionally, in the B+ tree, when a new record is inserted, the number of the write operation in a middle area of a node tends to be higher than other areas by generally using an insertion sort operation. Further, as regards a primary area of a node, every time a new node generates, the write operation is made by recording the number of records of the node, thus, the number of the write operation in one node can be the highest.

As described above, concentration of the write operation for a certain area of the B+ tree should be solved in order for the PCM to be used as a storage device of a database, because the concentration would severely harm the durability of the nonvolatile RAM such as a PCM. In order to solve the durability issue of the PCM, a method of storing the number of the write operation may be used, as the NAND flash memory performs. However, the PCM is configured to read/write per bite. So, the method cannot be used practically. In order for the PCM to be used as a storage device of the database system or the file system, a new method of securing durability is required.

DISCLOSURE

Technical Problem

The present disclosure was designed to solve the conventional disadvantages as described above, and has an objective to provide a Database method for a B+ tree based on a PRAM characterized of enhancing the durability and data processing capability, by utilizing the B+ tree construction to be applied to the data construction of the PRAM.

Technical Solution

To accomplish the objective, the present disclosure provides, a Database method for a B+ tree based on a PRAM, comprising the operations of:

dividing data storage space in each node into area 1 and area 2; and inserting, retrieving, and deleting a certain key value in record for the each node.

The operation of inserting the key value is characterized of preferentially inserting a new key value to the area 2 in case where area 2 in the node is not in a full state.

The operation of retrieving the key value is characterized of identifying whether the node is a leaf node, and sequentially retrieving the area 1 and the area 2 in case where the node is a leaf node.

The operation of deleting the key value is characterized of merging area 1 and area 2 in the node, and deleting the key value in the merged node.

The operation of inserting the key value is characterized of moving a certain key value in the area 2 to the area 2 in case where the area 2 in the node is in a full state.

The operation of inserting the key value is characterized of sorting the key value that is moved to the area 1 in the node, in the manner of an ascending order or a descending order.

The operation of inserting the key value is characterized of:

merging the area 1 and the area 2 in case where the node is in a full state;

sending a median key value to a parent node by splitting the node; and moving the rest key values to a split node with divided in half.

The operation of retrieving the key value comprises the operations of:

in case where the node is not a leaf node, selecting an approximate key value to a desired key value among the key values selected from the area 1 and the area 2;

moving the selected value to a node below indicated by the key value; and repeating the operation of moving, until the node is a leaf node, and then, terminating the retrieving the key value.

The operation of deleting the key value is characterized of splitting the merged node into area 1 and area 2.

The operation of deleting the key value is characterized of:

performing only in the leaf node;

deleting the key value after moved to the leaf node by changing its position with the subsequent key value in case where the key value to be deleted is in another node that is not the leaf node.

Advantageous Effects

According to the Database method for the B+ tree based on the PRAM of the present disclosure, the general number of the write operation is reduced by applying the B+ tree construction to a data construction of a nonvolatile RAM (PRAM) such as a PCM or else. Further, the durability of the nonvolatile RAM such as a PCM can be enhanced by preventing concentration of the write operation for a certain area of the conventional B+ tree construction, and a data processing capability can also be enhanced.

BEST MODES FOR CARRYING OUT THE DISCLOSURE

Hereinafter, embodiments of the present disclosure will be described in detail with reference to the accompanying drawings.

Figure 1:
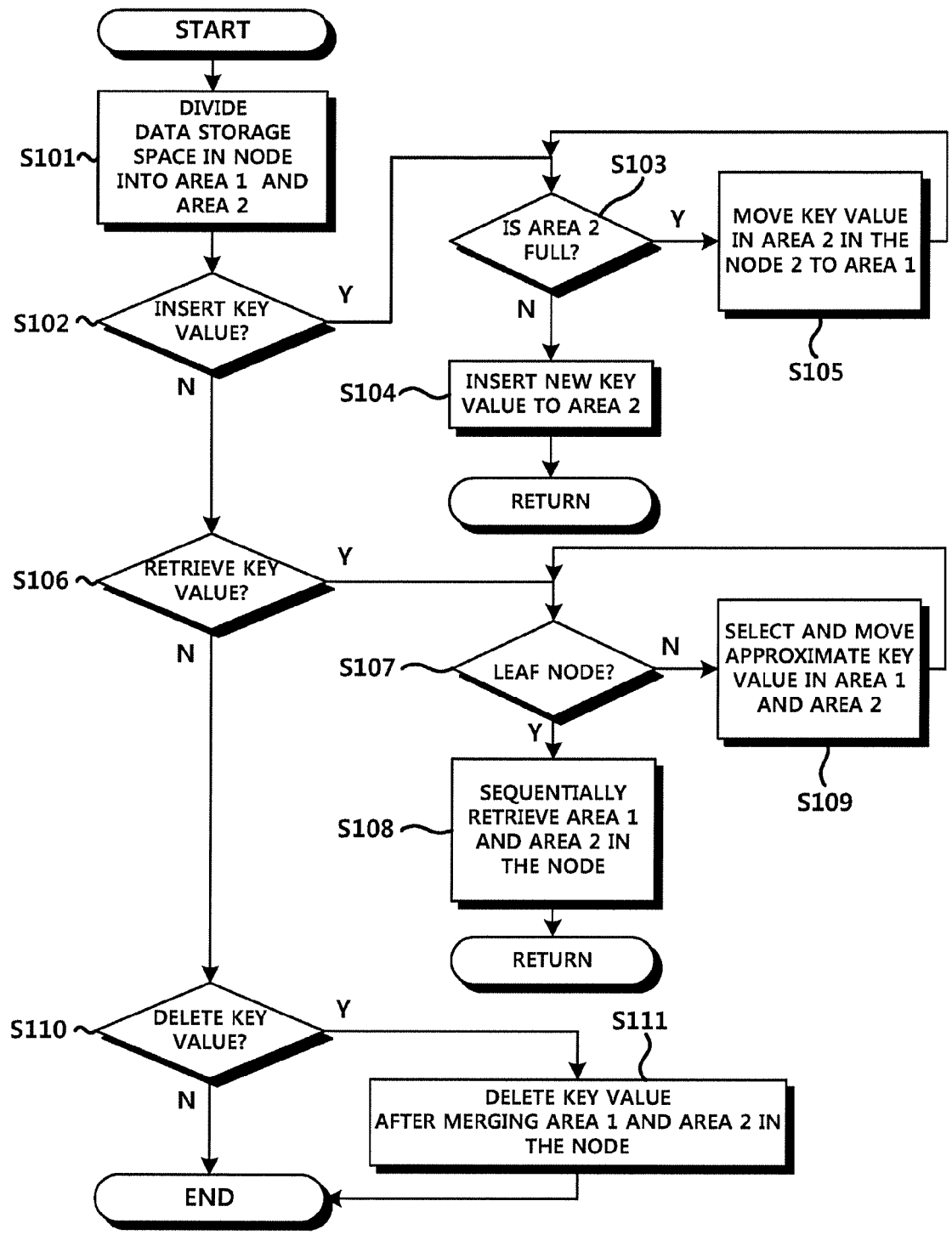
FIG. 1 illustrates a flow chart of a Database method for a B+ tree based on a PRAM according to an exemplary embodiment of the present disclosure.

FIG. 1 illustrates a flow chart of a Database method for a B+ tree based on a PRAM according to an exemplary embodiment of the present disclosure.

Generally, the B+ tree construction, as a tree configured to improve incompleteness of a sequential access of a B− tree, is configured to have an index set which provides a route to find a leaf node and have a sequence set where all nodes, including an inside node of the tree, are listed to the leaf node sequentially.

Hereat, the index set is only used for a route to access to the leaf node. Thus, a key value of the node which belongs to the index set would be shown again to the leaf node of the sequence set, and connected to the leaf node of the sequence set sequentially.

Therefore, the B+ tree is generally used to be installed to an index file which directly/sequentially accesses to a record corresponding to a node of the file.

Further, a root node in the B+ tree construction has 0, 2, or n/2 or more subtrees, if an order of the number is "n", all nodes other than the root and leaf nodes have n/2 or more subtrees.

Additionally, the root node is in an identical level to the all nodes, and the number of the key of the node that is not a leaf node is smaller than that of the subtree; the leaf node is connected to be listed, as an order set of the file.

As illustrated in FIG. 1, the database method for the B+ based on the PRAM of the present disclosure provides the operations of: dividing data storage space in each node into area 1 and area 2 (S101); and inserting (S102~S105), retrieving (S106~S109), and deleting (S110~S111) a certain key value in record for the each node.

The operation of inserting the key value (S102~S105) is characterized of preferentially inserting a new key value to the area 1 in case where area 2 in the node is not in a full state (S105).

The operation of inserting the key value (S102~S105) is characterized of moving a certain key value in the area 2 to the area 1 in case where the area 2 in the node is in a full state.

The operation of inserting the key value (S102~S105) is characterized of sorting the key value that is moved to the area 1 in the node, in the manner of an ascending order or a descending order.

The operation of inserting the key value (S102~S105) is characterized of:

merging the area 1 and the area 2 in case where the node is in a full state;

sending a median key value to a parent node by splitting the node; and moving the rest key values to a split node with divided in half.

The operation of retrieving the key value (S106~S109) is characterized of identifying whether the node is a leaf node, and sequentially retrieving the area 1 and the area 2 in case where the node is a leaf node (S108).

The operation of retrieving the key value (S106~S109) comprises the operations of:

in case where the node is not a leaf node, selecting an approximate key value to a desired key value among the key values selected from the area 1 and the area 2;

moving the selected value to a node below indicated by the approximate key value; and repeating the operation of moving, until the node is a leaf node, and then, terminating the retrieving the key value.

The operation of deleting the key value (S110~S111) is characterized of merging area 1 and area 2 in the node, and deleting the key value in the merged node.

The operation of deleting the key value (S110~S111) is characterized of splitting the merged node into area 1 and area 2.

The operation of deleting the key value is characterized of:

performing only in the leaf node;

deleting the key value after moved to the leaf node by changing its position with the subsequent key value in case where the key value to be deleted is in another node that is not the leaf node.

MODES FOR CARRYING OUT THE DISCLOSURE

Figure 2:
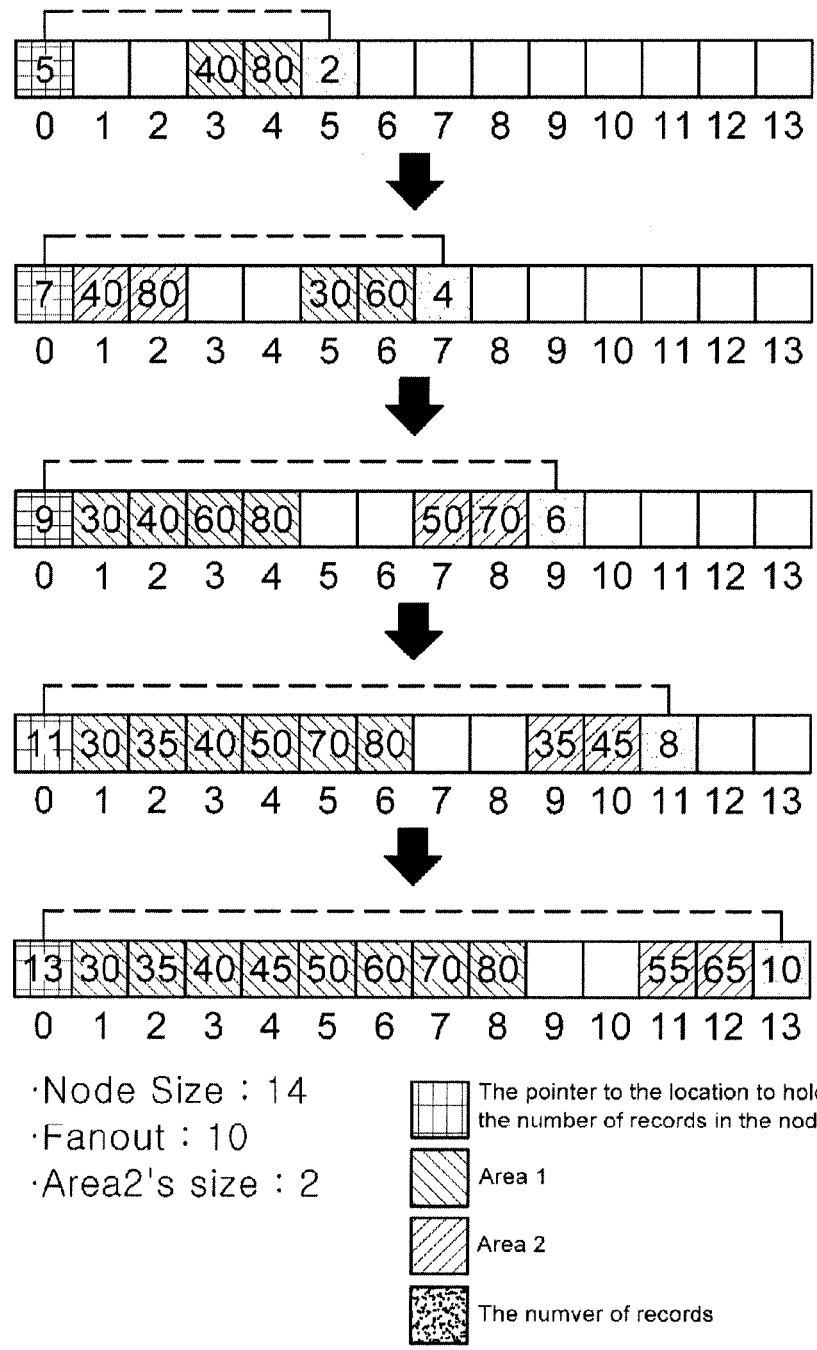
FIG. 2 illustrates a block diagram of an operation of inserting a key value without splitting according to an exemplary embodiment of the present disclosure.
Figure 3:
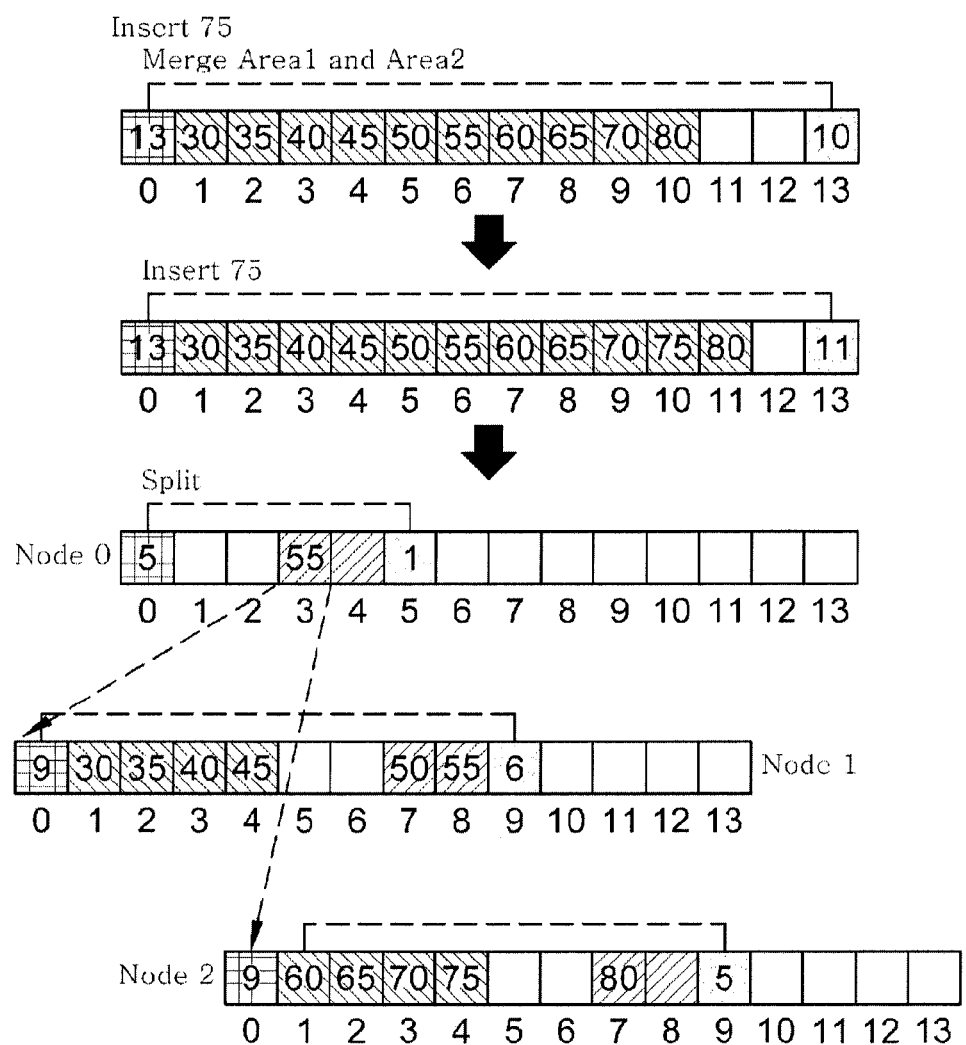
FIG. 3 illustrates a block diagram of an operation of inserting a key value with splitting according to an exemplary embodiment of the present disclosure.

FIGS. 2 and 3 illustrate block diagrams of an operation of inserting a key value according to an embodiment of the present disclosure. An exemplary embodiment of the present disclosure regarding inserting a certain key value will be described with reference to the accompanying drawings.

At first, a grid block indicating a dotted block represents the number counted by tracing the number of records in the dotted block. A diagonal block represents records in the data in the node.

As illustrated in FIG. 2, the operation of inserting a key value without splitting is characterized of sequentially inserting key values of 40, 80, 60, 30, 70, 50, 35, 45, 55 and 65 to node.

At first, a value in a grid block is 5, a value in a dotted block is 0. Hereat, 40 and 80 are inserted to area 2. When 60 is inserted to area 2, the two records are moved to area 1, since the area 2 is in a full state.

Additionally, a value in a grid block and a value in a dotted block area changed into 7 and 3 respectively. After inserting 30, 70, 50, 35, 45, 55, and 65 sequentially, it would be understood that the node becomes a full state, as illustrated in FIG. 2.

As illustrated in FIG. 3, the operation of inserting a key value with splitting is characterized of splitting a node, while inserting a key value. A first splitting method would be merging area 1 and area 2 in order to insert a key value of 75 to a node.

Thereafter, when inserting 75 to the merged area, the number of records becomes 11.

For the split, a median key value of 55 is chosen between eleven record key values. By splitting, 30, 35, 40, 45, 50 and 55 will be attached to a left child node 1 (Node 1). Record key values of 60, 65, 70, 75 and 80 will be attached to a right child node 2 (Node 2). A record key of 55 is inserted to a new index node in a parent node (Node 0), as illustrated in FIG. 3.

Figure 4:
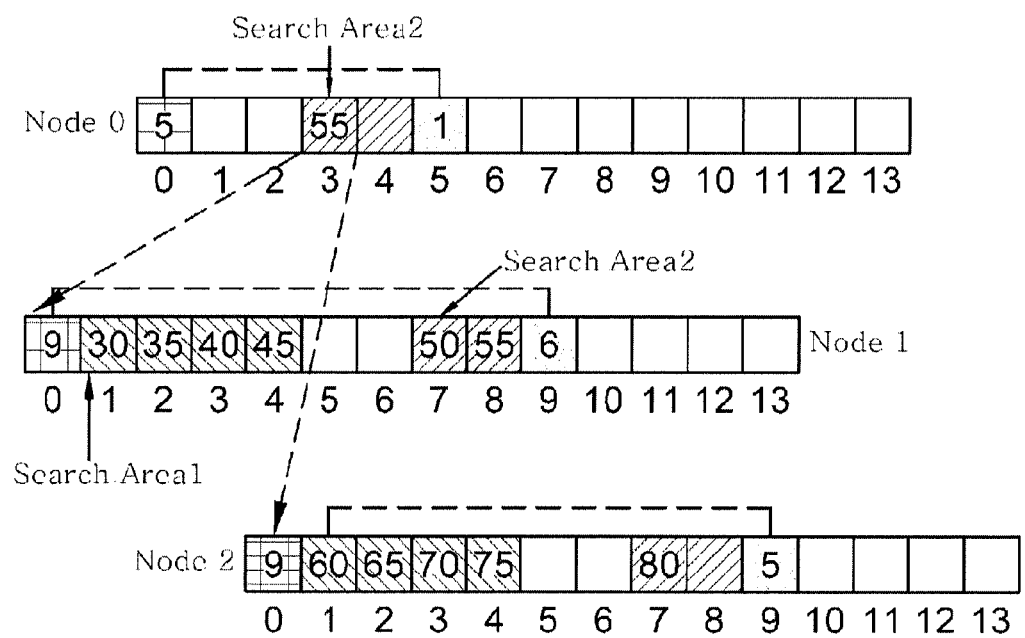
FIG. 4 illustrates a block diagram of an operation retrieving a key value according to an exemplary embodiment of the present disclosure.

FIG. 4 illustrates a block diagram of an operation of retrieving a key value according to an exemplary embodiment of the present disclosure. An exemplary embodiment of the present disclosure regarding retrieving a key value will be described with reference to the accompanying drawing.

As illustrated, when retrieving a value of 50 in area 1 and area 2 in node 0, only area 2 will be retrieved since area 1 is empty. At the retrieval, 55 is chosen as a minimum value which is greater than 50, and connected to a child node (Node 1) left from the 55.

Then, area 1 and area 2 are retrieved in the child node (Node 1) to find a minimum record value which would be more accurate to or greater than 50. If there is no record greater than 50 in all records in the area 1, 50 is chosen in area 2. Finally, 50 is discovered from area 2 in the child node (Node 1).

Figure 5:
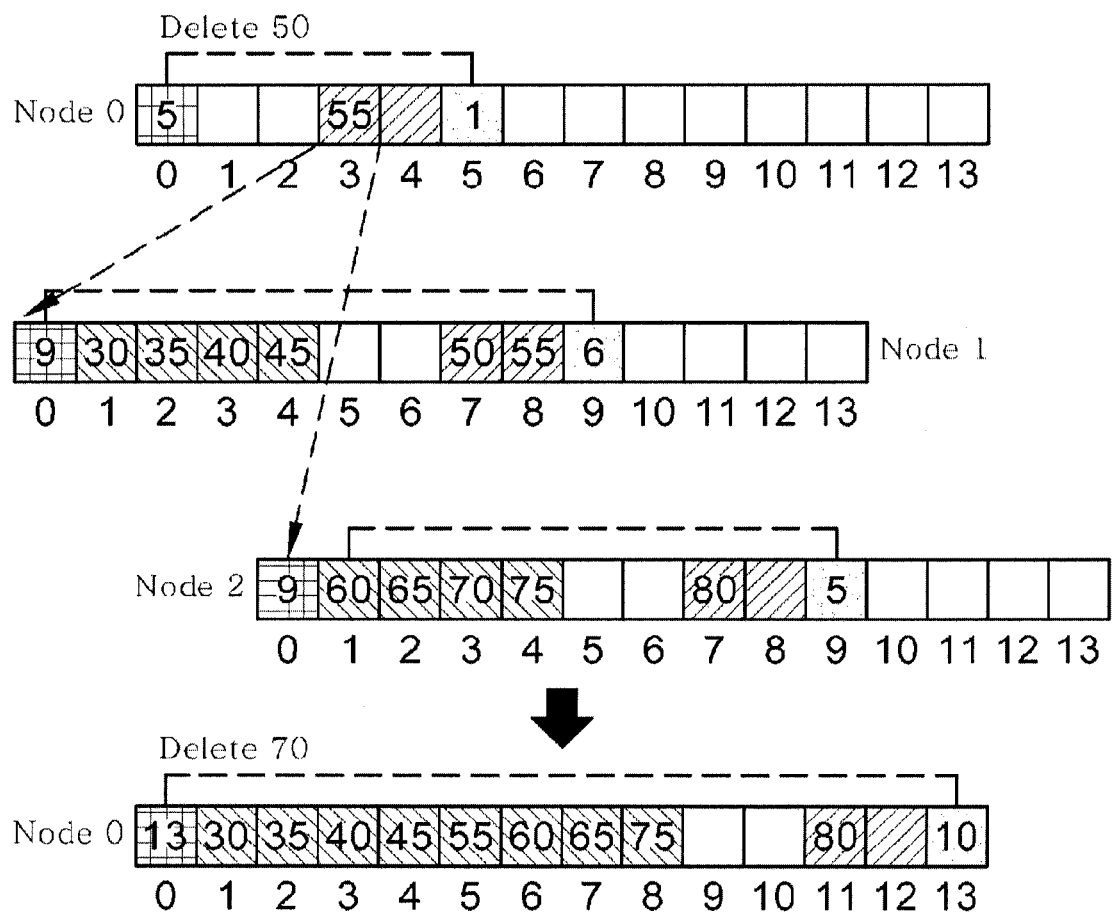
FIG. 5 illustrates a block diagram of an operation of deleting a key value according to an exemplary embodiment of the present disclosure.

FIG. 5 illustrates a block diagram of an operation of deleting a key value according to an exemplary embodiment of the present disclosure. An exemplary embodiment of the present disclosure regarding deleting a key value will be described with reference to the accompanying drawing.

As illustrated, in order to delete 50, firstly, 50 should be found through retrieving a first key value in area 2 in the node 1. After finding 50, 50 can be simply deleted from area 2 in the node 1. Hereat, if records in node are less than half, merger between nodes is not generated.

Next, in order to delete again a record key value of 70 in the node 2; hereat, the record cannot be brought from a brother node (node 1). If a record moves to node 1, the number of records in the node 2 would be less than 5.

Therefore, merger operation is required after deleting 70. In order to merge the node 1 and the node 2, firstly, area 1 and area 2 in each node should be merged and then, the node 1 and node 2 would be merged.

After merging the node 1 and the node 2, a next step proceeds. 55 is deleted in a root node (node 0). This is because only one leaf node is left. Then, the Node 0 is removed and, the node 1 becomes a root node since the node 0 is empty.

INDUSTRIAL APPLICABILITY

According to the Database method for the B+ tree based on the PRAM described so far, by applying the B+ tree construction to a data construction of a nonvolatile RAM (PRAM) such as a PCM; the number of a write operation would be reduced generally, the concentration of the writing for a certain area of the conventional B+ tree would be prevented. Thus, durability of a nonvolatile RAM such as a PCM or else may be enhanced, including the data processing capability.

So far, the specific embodiments of the present disclosure were described. A skilled person in the art can attempt to make various inventive alterations based on the present disclosure. However, the various alternate works would fall within the scope of the gist of the present disclosure. Further, it should be interpreted that all the differences in the range similar/equivalent to the present disclosure are included in the present disclosure.

What is claimed is:

1. A Database method for a B+ tree having a predetermined B+ tree construction based on a processor executing instructions in a memory for processing data in a data storage space of a phase-change non-volatile random access memory (PRAM), comprising the operations of:
   dividing the data storage space in each of a plurality of nodes of a B+ tree into an area 1 and an area 2, wherein each node includes a plurality of data records, a location which specifies the total number of data records in the node and a pointer to the location, and the area 1 and the area 2 each include a number of data records in the node, wherein the total number of records in area 1 and area 2 is equal to the total number of data records in the node;
   sequentially accessing said plurality of data records; and
   inserting, retrieving, and deleting a certain key value with respect to each of the sequentially accessed data records, and
   wherein the operation of inserting the key value inserts a new key value to the area 2 if the area 2 in the node is not in a full state, and moves a certain key value to the area 1 if the area 2 is in a full state;
   wherein the operation of retrieving the key value identifies whether the node is a leaf node, and sequentially retrieving the area 1 data records and the area 2 data records if the node is a leaf node, and if the node is not a leaf node, selecting an approximate key value among the key values from the area 1 and the area 2, moving the selected value to a record in the node below indicated by the key value, and repeating the operation of moving, until the node is a leaf node, and then, terminating the retrieving the key value;
   wherein the operation of deleting the key value merges area 1 data records and area 2 data records in the node, and deletes the key value in the merged node,
   wherein said executing modifies the B+ tree construction which reduces a number of write operations to said PRAM and minimizes a concentration of write operations to a certain area of said PRAM.

2. The Database method according to claim 1, wherein the operation of inserting the key value sorts the key value that is moved to the area 1, in the manner of an ascending order or a descending order.

3. The Database method according to claim 1,
   wherein the operation of inserting the key value comprises:
   merging the area 1 and the area 2 if the node is in a full state;
   sending a median key value to a parent node by splitting the node; and
   moving additional key values to one of the nodes resulting from the splitting.

4. The Database method according to claim 1, wherein the operation of deleting the key value comprises splitting the merged node into two areas.

5. The Database method according to claim 4,
   wherein the operation of deleting the key value comprises:
   performing only in the leaf node;
   deleting the key value after moving the key value to the leaf node by changing its position with a subsequent key value if the key value to be deleted is in another node that is not the leaf node.

* * * * *